Patented June 3, 1952

2,599,299

UNITED STATES PATENT OFFICE 2,599,299

ALIPHATIC AZO COMPOUNDS HAVING GUANYL RADICALS ON TERTIARY CARBON ATTACHED TO AZO NITROGEN

Robert W. Upson, Wilmington, Del., assignor to E. I. du Pont de Nemours and Company, Wilmington, Del., a corporation of Delaware No Drawing. Application June 23, 1950, Serial No. 170,027

3 Claims. (Cl. 260—192)

This invention relates to new azo compounds and more particularly to new water-soluble azo compounds which contain guanyl groups.

In U. S. 2,471,959 it has been shown that certain organic azo compounds which have an acyclic azo group bonded from its nitrogens to aliphatic carbons of a particular character are useful as polymerization initiators, or catalysts, for polymerizable ethylenic compounds. These catalysts have several advantages over the more conventional type which have directly linked oxygen atoms, such as benzoyl and other peroxides. The latter type polymerization initiators provide a source of oxygen which may change the properties of the polymer obtained by discoloration, oxidation of any added modifiers and insolubilization. The azo compounds disclosed in U. S. 2,471,959 do not have these defects and represent a considerable advance in polymerization. However, the compounds disclosed are generally water-insoluble, and accordingly not convenient to employ in the direct preparation of polymer dispersions by the polymerization of polymerizable ethylenically unsaturated compounds in water systems at relatively low temperatures.

It has been proposed (see U. S. Patent 2,520,338, issued August 29, 1950 on application Serial No. 757,682, filed June 27, 1947) that carboxylic groups be introduced in one of the hydrocarbon chains of the azonitriles but at some distance from the azo and nitrile groups. The alkali metal salts of such carboxylic azonitriles possess limited solubility in aqueous systems which are neutral to basic. These compounds are not soluble in aqueous acidic solutions. The latter are preferable for many reactions, particularly for polymerizations of olefinic hydrocarbons and certain acrylic compounds to obtain superior properties in the resulting polymer.

This invention has as an object the preparation of new compounds. A further object is the preparation of useful catalysts, particularly for polymerization. Other objects will appear hereinafter.

These objects are accomplished by the following invention of organic azo compounds wherein the azo, —N=N—, group is acyclic and bonded from both of the nitrogens to discrete carbons which are aliphatic, at least one and generally both of the discrete carbons being tertiary and having as one of the groups attached to tertiary carbon, an inorganic acid salt of a guanyl radical. A preferred group is that of organic azo compounds the azo group, —N=N—, of which is acyclic and joined to two aliphatic radicals, saturated hydrocarbon except for guanyl salt groups on the two carbons attached to said azo group which carbons are tertiary. Particularly preferred are the inorganic acid salts of bis(dialkylguanyl)azoalkanes in which the alkyl radicals are lower alkyls, particularly of from 1 to 4 carbons.

In general, these compounds may be prepared by the treatment of an azonitrile in an anhydrous system with an alcohol, hydrogen halide and a hydrogen-bearing amine of the formula $HNR_2$ where R is hydrogen or an organic radical, preferably a hydrocarbon radical of 1 to 6 carbons.

The following examples in which parts are by weight are illustrative of the invention.

EXAMPLE I

A slurry consisting of 82 parts of alpha,alpha'-azodiisobutyronitrile and 400 parts of absolute methanol was cooled to 5–10° C. and was saturated with anhydrous hydrogen chloride. The resulting mixture was kept at 5° C. for 68 hours. After collecting the solid material on a filter, it was washed with cold absolute methanol and collected once more on a filter. The resulting crude solid amounted to 70 parts. This solid was stirred with 40 parts of absolute methanol while adding a solution consisting of 40 parts of anhydrous ammonia in 270 parts of absolute methanol. This mixture was stirred for six hours and allowed to stand for 16 hours. A small amount of solid believed to be $NH_4Cl$ was collected on a filter and discarded. The filtrate was evaporated to dryness at room temperature and the resulting solid was shaken with 150 parts of water. The insoluble portion was removed by filtration and the filtrate evaporated to dryness. The dry hydrochloride of 2,2'-diguanyl-2,2'-azopropane amounted to 18.5 parts (13.6%) and the melting point (with decomposition) was 165–170° C.

Analysis

Calculated for $C_8H_{20}N_6Cl_2$: N, 30.9%; Cl, 26.1%.
Found: N, 30.42%; Cl, 26.05%.

EXAMPLE II

To 160 parts of anhydrous ethanol was added 33 parts of alpha,alpha'-azodiisobutyronitrile. The slurry was cooled to 5–10° C. and 107 parts of anhydrous hydrogen chloride was added. The resulting mixture was allowed to warm up to 25° C. at which temperature a complete solution was obtained. This solution was cooled to 5° C. and kept at that temperature for 24 hours. The solid which formed was collected on a filter, washed with absolute ethanol and collected on a filter once more. The resulting crude solid amounted to 86 parts. A slurry of the washed solid and 40 parts of absolute ethanol was cooled to 10° C. and a solution of 20 parts of anhydrous ammonia in 106 parts of absolute ethanol was added. The mixture was stirred for two hours and allowed to stand for 16 hours. The solid was collected on a filter and dried under vacuum. The dried hydrochloride of 2,2'-diguanyl-2,2'-azopropane amounted to 51.2 parts (94.2%) and the melting point (with decomposition) was 175° C.

EXAMPLE III

A solution of 38.4 parts of alpha,alpha'-azobis-(alphamethylbutyronitrile) and 160 parts of absolute ethanol was cooled to 5–10° C. and was saturated with 107 parts of anhydrous hydrogen chloride. The solution was allowed to warm up to 20° C. and then cooled to 5° C. The temperature was kept at 5° C. for eleven days. The mixture was cooled in a Dry Ice-acetone bath and the resulting solid was collected on a filter. After washing with alcohol, the crude dry solid amounted to 23 parts. A slurry of the washed solid and 40 parts of absolute ethanol was cooled to 10° C. and a solution of 20 parts of anhydrous ammonia in 106 parts of absolute ethanol was added. The mixture was stirred at 25° C. for four hours. The resulting solid was collected on a filter after cooling the mixture. The filtrate was mixed with an equal volume of anhydrous ether and the precipitated solid collected on a filter. The dried hydrochloride of 2,2'-diguanyl-2,2'-azobutane amounted to 5.5 parts (9.2%) and melted (with decomposition) at 171° C.

*Analysis*

Calculated for $C_{10}H_{24}N_6Cl_2$: N, 28.1%; Cl, 23.7%. Found: N, 27.95%; Cl, 22.80%.

EXAMPLE IV

A mixture of 33 parts of alpha,alpha'-azodiisobutyronitrile and 160 parts of absolute ethanol was cooled to 5–10° C. and 104 parts of anhydrous hydrogen chloride was added. The resulting mixture was allowed to warm up to 25° C. at which temperature a complete solution was obtained. This solution was cooled to 5° C. and kept at this temperature for three days. The solid which formed was collected on a filter and washed with absolute alcohol. The resulting crude solid amounted to 84 parts. A slurry of the washed solid and 40 parts of absolute ethanol was cooled to 10° C. and a solution of 47 parts of aniline in 106 parts of absolute ethanol was added. This mixture was stirred for three hours at 25° C. after which time it was cooled and the resulting solid collected on a filter. The crude solid was washed with cold ethanol and dried. The dried 2,2'-bis(N-phenylguanyl)-2,2'-azopropane dihydrochloride amounted to 38 parts (45%) and melted (with decomposition) at 141° C.

*Analysis*

Calculated for $C_{20}H_{28}N_6Cl_2$: N, 19.8%; Cl, 16.75%. Found: N, 18.67%; Cl, 17.93%.

EXAMPLE V

A mixture of 33 parts of alpha,alpha'-azodiisobutyronitrile and 160 parts of absolute methanol was cooled to 5° C. and 137 parts of anhydrous hydrogen chloride was added. The resulting mixture was allowed to warm up to 20° C. at which temperature a solid began to precipitate from the clear solution. The mixture was kept at 20° C. for one-half hour and then cooled to 5° C. for one hour. The solid was collected on a filter, washed with absolute methanol, and dried in a desiccator for 12 hours. The resulting solid amounted to 48 parts. A slurry of the dried solid and 40 parts of absolute methanol was cooled to 5° C. and a solution consisting of 36.5 parts of diethylamine in 80 parts of absolute methanol was added. The mixture was kept at 5° C. for 24 hours after which time it was cooled to −70° C. and the resulting solid collected on a filter. This was identified as diethylamine hydrochloride. The filtrate was evaporated to dryness and the residue washed with acetone and dried. The material was 2,2'-bis(N,N-diethylguanyl) - 2,2' - azopropane dihydrochloride and amounted to 6.3 parts. The compound melted (with decomposition) at 157° C. and initiated the polymerization of acrylonitrile in water at 60° C.

EXAMPLE VI

To 400 parts of absolute ethanol was added 82 parts of alpha,alpha'-azodiisobutyronitrile. The mixture was cooled to 5° C. and saturated with anhydrous hydrogen chloride. The mixture was kept at 5° C. for two days after which time the solid which formed was collected on a filter, washed with absolute ethanol, and weighed. The crude solid amounted to 198 parts. A slurry, consisting of 74 parts of the solid and 40 parts of absolute ethanol, was cooled to 5° C. and allowed to react with a solution of 25.2 parts of ethanolamine in 104 parts of absolute ethanol. The mixture was stirred for one hour after which time the solid was collected on a filter. This was identified as ethanolamine hydrochloride. The filtrate was mixed with an equal volume of ether and the resulting solid collected on a filter. It was dissolved in 160 parts of absolute methanol followed by the addition of 35 parts of ether. The mixture was cooled to −70° C. and the solid which formed was collected on a filter. The dried 2,2'-bis(N - hydroxyethylguanyl) - 2,2' - azopropane dihydrochloride amounted to 1.7 parts and melted (with decomposition) at 165° C. It initiated the polymerization of acrylonitrile in water at 60° C.

The present invention is generic to azo compounds which contain a guanyl radical attached to a tertiary carbon which carbon is further attached to an acyclic azo group. A desirable class of these azo compounds is that of the symmetrical azo compounds saturated aliphatic hydrocarbon except for the azo group and the two guanyl salt groups since these compounds are in general more readily prepared without complications in the reaction. A preferred class has the formula

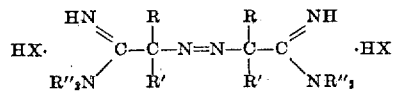

wherein $R$ and $R'$=normal, i. e., straight chain, alkyl radicals of 1 to 4 carbons, e. g., methyl, ethyl, n-butyl, and $R''$=H, or a monovalent organic radical of 1 to 6 carbons, e. g., methyl, butyl, hexyl, phenyl, while HX represents an inorganic acid and suitably a hydrogen halide. In a still more preferred embodiment, these compounds are saturated acyclic aliphatic hydrocarbon, except for the nitrogen atoms (both azo and guanyl) and acids.

The invention is thus inclusive of the hydrochlorides and hydrobromides of 2,2'-bis(N,N-dimethylguanyl)-2,2'-azobutane, 3,3' - bis(N,N-di-n-butylguanyl)-3,3'-azopentane, and 5,5'-diguanyl-5,5'-azononane.

Ordinarily the hydrochloride and hydrobromide, i. e., the hydrides of halogens of atomic number between 17 and 35 are prepared. From these other salts, e. g., the sulfate, nitrate, fluoride, perchlorate may be prepared by double decomposition or from the free base but these procedures introduce difficulties, complications and expense wherefore the hydrobromides and particularly the hydrochlorides are preferred.

These compounds can be prepared by the following steps: (a) treatment of the azonitrile, e. g., alpha,alpha'-azodiisobutyronitrile, in an alkanol medium with a hydrogen halide under anhydrous conditions, (b) separation of the salt thus obtained, and (c) treatment with a hydrogen-bearing amine, including ammonia, aniline, diphenylamine, diethylamine, in an alkanol medium. The above reactions are carried out under anhydrous conditions and at temperatures of generally in the range of —10 to 30° C.

The azonitriles from which the guanyl salts are prepared can be obtained by the procedure of Thiele and Heuser, Ann. 290, 1-43 (1896), Dox, J. Am. Chem. Soc. 47, 1471 (1925) and Alderson & Robertson U. S. 2,469,358.

The guanyl salts are of particular utility as catalysts, or initiators, for chain reactions, e. g., chlorination and chlorosulfonation of hydrocarbons, and particularly as polymerization catalysts in the addition polymerization, including copolymerization, of polymerizable compounds containing ethylene double bonds. Numerous compounds of this type are known in the art and include monoolefins such as ethylene, diolefins such as butadiene, vinyl esters such as vinyl fluoride and vinyl acetate, vinylidene halides such as vinylidene chloride, acrylyl and methacrylyl compounds such as acrylonitrile and methyl methacrylate, polyfluoroethylenes such as tetrafluoroethylene.

The water-soluble character of the acid salts of the guanyl compounds of this invention permits them to be used with particular advantage in water systems. A particularly important advantage is that they may be used in aqueous systems which are neutral or acidic. The temperatures at which these compounds initiate these reactions are usually 25-125° C. An outstanding advantage of these compounds is that they can be used in the preparation of dispersions of polymerized ethylene which have higher molecular weight and more uniform and advantageous particle size than heretofore obtainable with other catalysts. They may also be used as catalysts in the chlorination of benzene in aqueous media.

The foregoing detailed description has been given for clearness of understanding only and no unnecessary limitations are to be understood therefrom. The invention is not limited to the exact details shown and described for obvious modifications will occur to those skilled in the art.

What is claimed is:

1. 2,2'-diguanyl-2,2'-azopropane dihydrochloride.

2. An azo compound of the formula

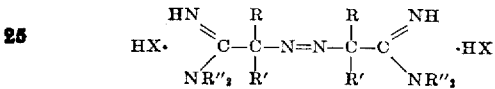

wherein HX is an inorganic acid, R and R' are straight chain alkyl radicals of one to four carbons, and R'' is selected from the class consisting of hydrogen and monovalent saturated aliphatic hydrocarbon radicals of one to six carbons.

3. An azo compound according to claim 1 wherein the acids are hydrogen halides and the molecule, apart from the azo nitrogens and the acids, is saturated aliphatic hydrocarbon.

ROBERT W. UPSON.

REFERENCES CITED

The following references are of record in the file of this patent:

UNITED STATES PATENTS

| Number | Name | Date |
|---|---|---|
| 1,958,371 | Schmelkes | May 8, 1934 |
| 2,471,959 | Hunt | May 31, 1949 |
| 2,520,338 | Robertson | Aug. 29, 1950 |

UNITED STATES PATENT OFFICE
CERTIFICATE OF CORRECTION

Patent No. 2,599,299                                                  June 3, 1952

Robert W. Upson

It is hereby certified that error appears in the printed specification of the above numbered patent requiring correction and that the said Letters Patent should read as corrected below.

Column 6, line 33, claim 3, for the claim reference numeral "1" read -- 2 --.

Signed and sealed this 10th day of May 1960.

(SEAL)
Attest:

KARL H. AXLINE
Attesting Officer

ROBERT C. WATSON
                                                              Commissioner of Patents